United States Patent
Bazydola et al.

(10) Patent No.: US 6,273,237 B1
(45) Date of Patent: Aug. 14, 2001

(54) ROTATING SHUTTLE PAYLOAD PLATFORM

(75) Inventors: Kenneth J. Bazydola, Waltham, MA (US); Robert J. Megee, Hampton, NH (US)

(73) Assignee: PRI Automation, Inc., Billerica, MA (US)

( * ) Notice: Subject to any disclaimer, the term of this patent is extended or adjusted under 35 U.S.C. 154(b) by 0 days.

(21) Appl. No.: 09/437,614

(22) Filed: Nov. 10, 1999

(51) Int. Cl.[7] ..................................................... B65G 47/24
(52) U.S. Cl. ...................................... 198/375; 198/377.01
(58) Field of Search ..................... 198/375, 377.01–377.1

(56) References Cited

U.S. PATENT DOCUMENTS

| | | | |
|---|---|---|---|
| 3,283,883 | 11/1966 | Cruzen, Jr. | 198/209 |
| 3,952,874 | 4/1976 | Owen | 209/73 |
| 4,886,155 | * 12/1989 | Toyonaga et al. | 198/377.02 |
| 5,014,843 | 5/1991 | Linton et al. | 198/377 |
| 5,535,999 | * 7/1996 | Ford | 198/377.03 |
| 5,579,890 | * 12/1996 | Harris | 198/377.1 |

* cited by examiner

Primary Examiner—Joseph E. Valenza
(74) Attorney, Agent, or Firm—Weingarten, Schurgin, Gagnebin & Hayes LLP

(57) ABSTRACT

A semiconductor wafer pod payload platform is operable for rotation in response to linear movement of the platform by a cam assembly having rollers adapted to engage a cam surface. The payload platform is rotatably attached to a shuttle platform adapted for movement along linear rails. The shuttle platform is supported by shuttle glides adapted to move along the linear rails. A cam follower assembly is connected to the payload platform through a shaft extending through the shuttle platform and operable to rotate the payload platform. A cam surface substantially parallel to the linear rails is adapted to engage rollers on the cam follower assembly. Linear movement of the shuttle platform causes the rollers on the cam follower assembly to engage the cam surface and dispose the cam follower assembly so as to rotate the payload platform via rotation of the shaft.

41 Claims, 5 Drawing Sheets

ROTATING SHUTTLE PAYLOAD PLATFORM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to manufacturing operations, and more specifically to a system and apparatus for transport of semiconductor wafers in a semiconductor wafer fabrication facility.

Shuttle platforms are known which transport a payload, such as a semiconductor wafer pod, about a manufacturing facility. The payload is manipulated by various fabrication processes at different locations. The use of a shuttle platform expedites transport, provides precise placement, and minimizes the potential for operator error, such as a dropped payload. In manufacturing of delicate products, such as semiconductor wafers, operator error can result in substantial losses.

It is often advantageous to rotate a payload on a shuttle platform. Rotation serves to dispose the payload for optimal access by the various fabrication processes which manipulate the payload. A payload may be rotated to orient the payload for storage, to position the payload for access to a sealed environment, to allow for pickup by a robotic arm, and for other fabrication operations.

Rotation may be provided by direct activation from a drive source, such as a servo motor, or selectively provided through a rotary indexing mechanism. A separate drive source, however, must then be provided and powered, thereby increasing complexity and cost. Further, such a drive source must be calibrated to provide the precise positioning required. Finally, as a payload such as semiconductor wafers must not be subjected to bumping or jarring, rotation must not accelerate or decelerate too abruptly to avoid damaging the payload.

It would be beneficial, therefore, to provide a rotating payload platform which does not require a separate drive source, which provides a smooth motion profile through rotary acceleration and deceleration, and which minimizes calibration maintenance without sacrificing precision of rotation.

BRIEF SUMMARY OF THE INVENTION

A semiconductor wafer pod payload platform is operable for rotation in response to linear movement of the platform by a cam assembly having rollers adapted to engage a cam surface. The payload platform is rotatably attached to a shuttle platform adapted for movement along linear rails. The shuttle platform is supported by shuttle glides adapted to move along the linear rails. A cam follower assembly is connected to the payload platform through a shaft extending through the shuttle platform and operable to rotate the payload platform. A cam surface substantially parallel to the linear rails is adapted to engage rollers on the cam follower assembly. Linear movement of the shuttle platform causes the rollers on the cam follower assembly to engage the cam surface and dispose the cam follower assembly so as to rotate the payload platform via the shaft.

A shuttle drive motor attached to the shuttle platform drives the platform along the linear rails by engaging a gear or roller along a drive track surface. As the shuttle platform moves, the rollers on the cam follower assembly follow the contour of the cam surface. The cam follower assembly has a plurality of rollers which follow different cam tracks on the cam surface. The cam follower assembly is therefore rotated as the rollers are disposed along the cam surface. The payload platform is thus rotated by the cam follower assembly through the shaft. Since rotary motion is derived from the linear movement through the cam assembly, no additional rotational drive sources are required. The cam surfaces do not require adjustment, and are shaped so as to provide a smooth cycloidal rotational momentum from a constant linear velocity.

BRIEF DESCRIPTION OF THE SEVERAL VIEWS OF THE DRAWING

The invention will be more fully understood with reference to the following detailed description and drawings, of which.

DETAILED DESCRIPTION OF THE INVENTION

Figure 1:
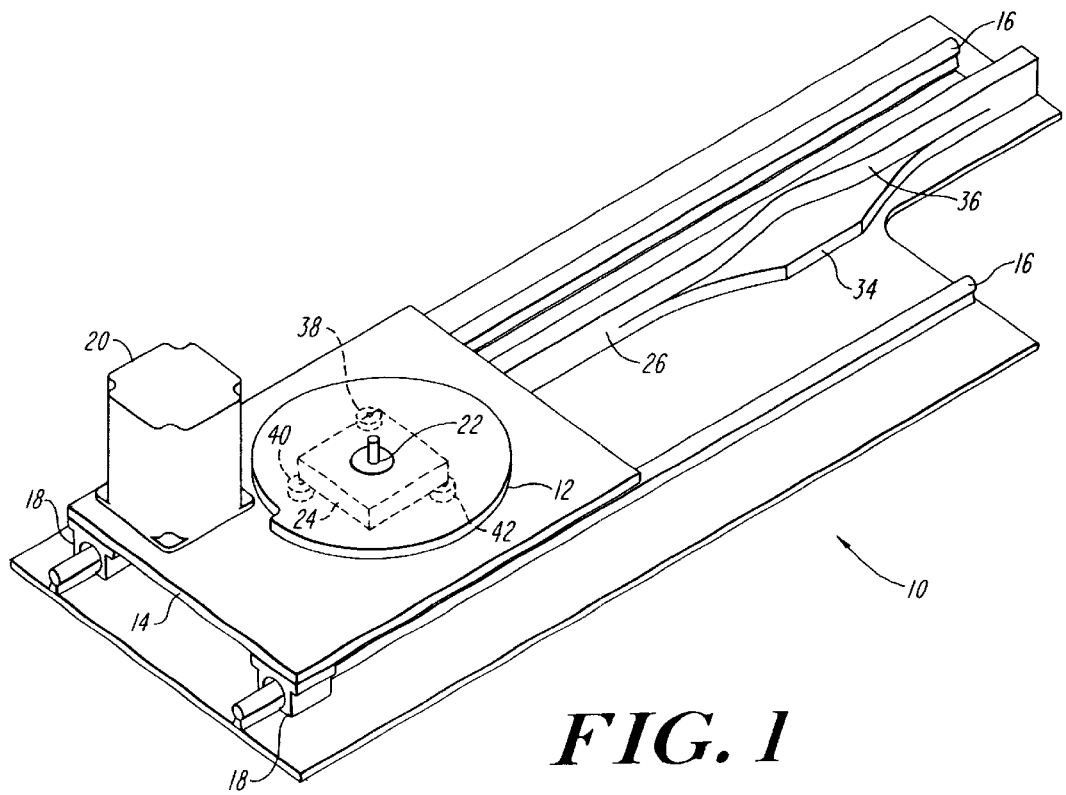
FIG. 1 is a perspective view of the shuttle platform apparatus as defined herein.

Referring to FIG. 1, the shuttle platform apparatus 10 includes a payload platform 12 rotatably mounted on a shuttle platform 14 by a shaft 22. The platform 14 is operable for movement along a pair of linear rails 16 by shuttle glides 18 attached to the underside of the platform 14. A shuttle drive motor 20 is adapted to move the shuttle platform along the rails 16. The shaft 22 attached to the payload platform extends through the shuttle platform. A cam follower assembly 24 is connected to the end of the shaft 22 beneath the shuttle platform 14. The cam follower assembly is operable to rotate the payload platform about the shaft 22. As the shuttle platform 14 is moved along the rails 16, rollers on the cam follower assembly 24, described further below, engage a cam surface 26 to rotate the payload platform 12.

Figure 2B:
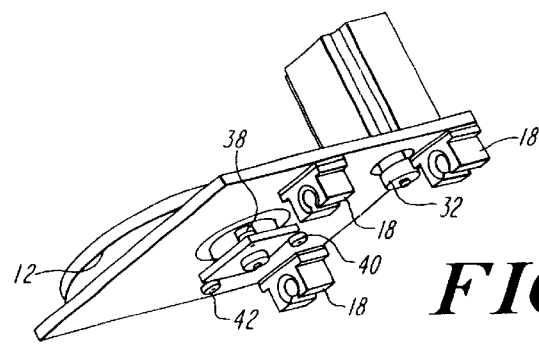
FIG. 2b is a view of the underside of the shuttle platform of FIG. 1.
Figure 2C:
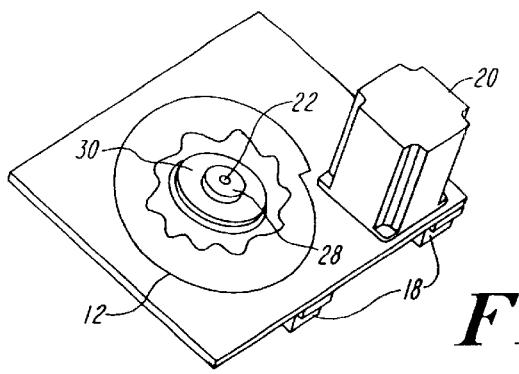
FIG. 2c is a perspective view of the shuttle platform and linear shuttle drive motor of FIG. 1.
Figure 2A:
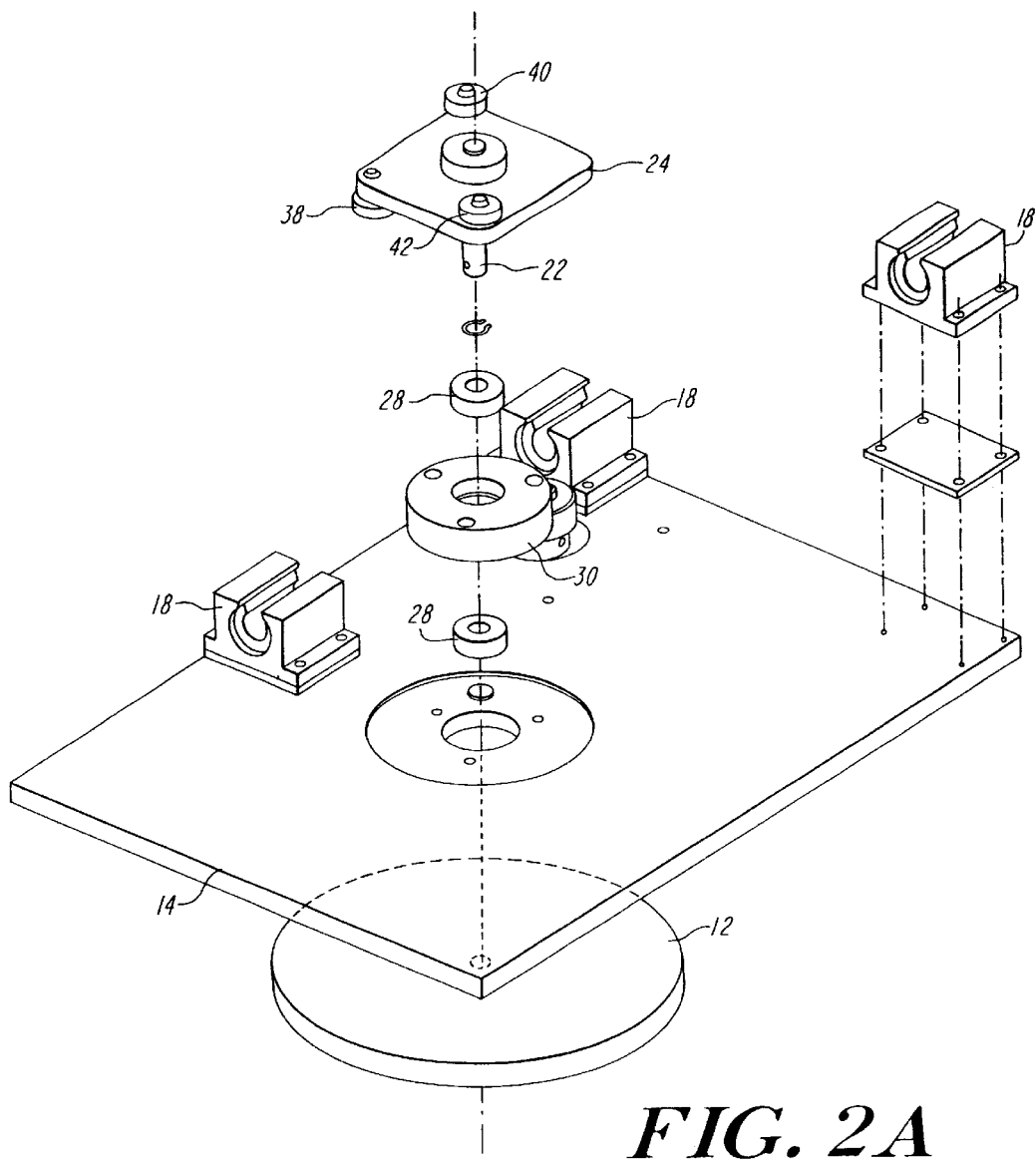
FIG. 2a is an exploded view of the underside of the shuttle platform of FIG. 1.

FIGS. 2a–2c show the shuttle platform in more detail. FIG. 2a is an exploded view of the underside of the shuttle platform which shows the cam follower assembly 24. The cam follower assembly includes three rollers 38, 40 and 42 adapted to engage the cam surface 26. The shaft 22 disposed through the shuttle platform 14 is secured by payload platform bearings 28 and shaft housing 30. The payload platform 12 is fixed to shaft 22 and rotates with the cam follower assembly 24 which is also fixed to the shaft. FIG. 2c shows the assembled shuttle platform with the payload platform cut away to show the connection to the shaft 22.

The shuttle platform 14 is supported by shuttle glides 18, which are attached by any suitable means to the underside of the shuttle platform. The shuttle glides 18 are formed of a rigid plastic adapted to slide along the rails. Alternatively, the glides include a bearing or other member which minimizes friction against the rails. The shuttle drive motor 20 rotates a drive roller 32 (FIG. 2b), in frictional contact with a side of the rail 16, to move the shuttle platform along the rails. Other suitable drive means, such as a drive gear engaging a gear track, can also be employed to move the shuttle platform.

Figure 3:
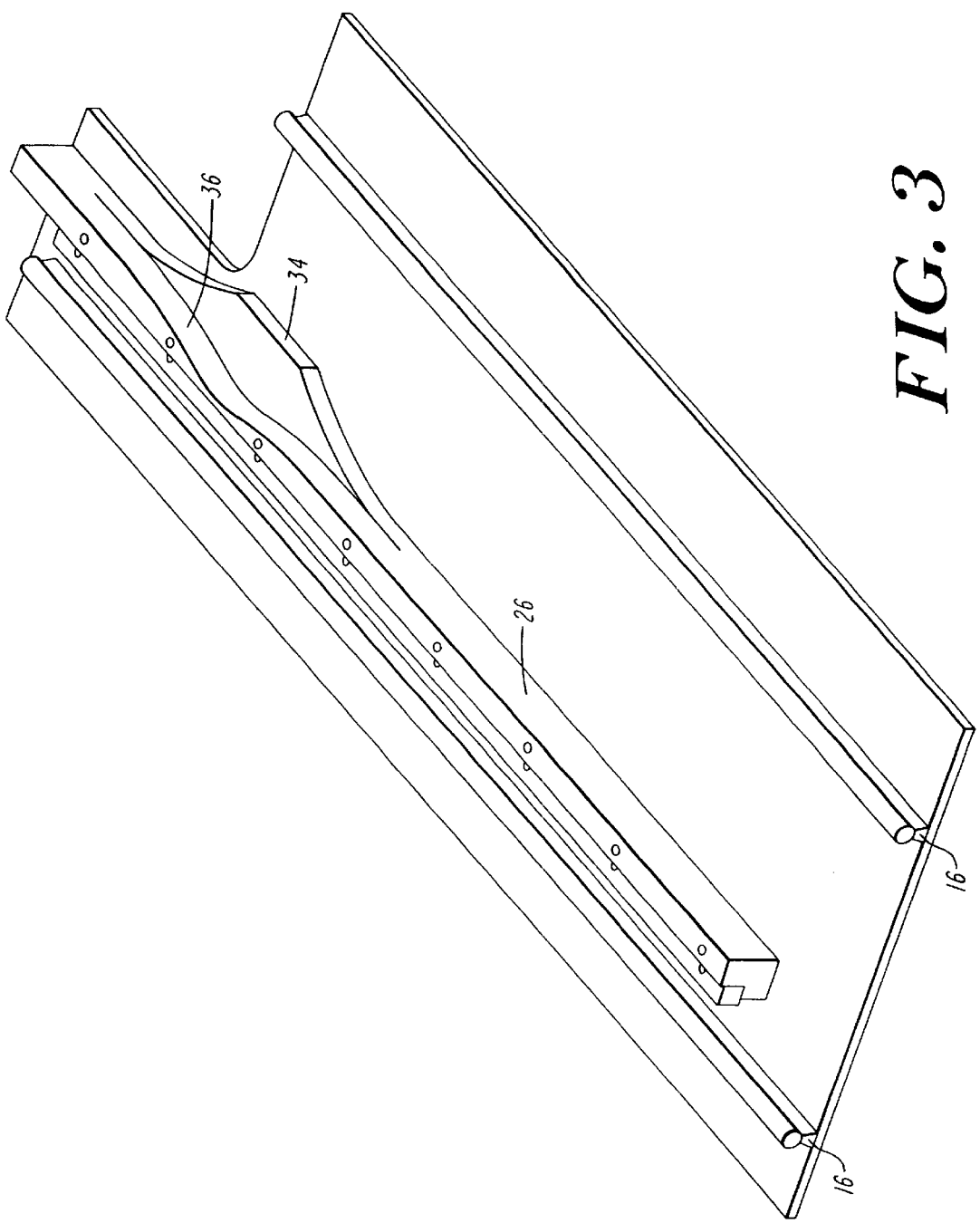
FIG. 3 is a perspective view of the cam surface of FIG. 1.

The shuttle platform apparatus 10 is shown with the shuttle platform removed in FIG. 3. The cam surface 26 includes an upper cam track 36 and a lower cam track 34. Referring again to FIG. 2a, the cam follower assembly includes an upper roller 38, and leading and lagging lower rollers 42 and 40, respectively. The upper roller 38 is disposed so as to engage the upper cam track 36, and the leading and lagging lower rollers 42, 40 are disposed so as to engage the lower cam track 34.

Figure 4A:
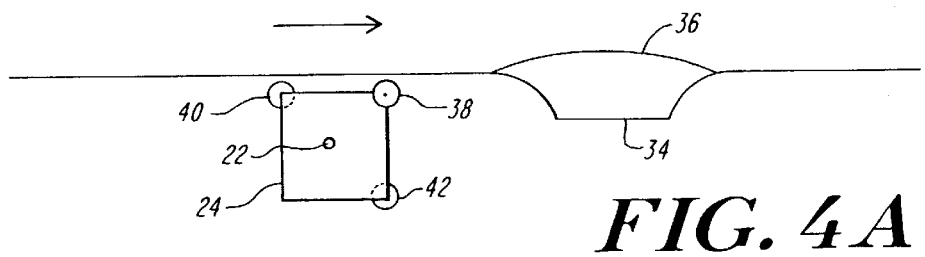
FIGS. 4a–4e are top views of the cam follower assembly on the underside of the shuttle platform of FIGS. 2a–2c.
Figure 4B:
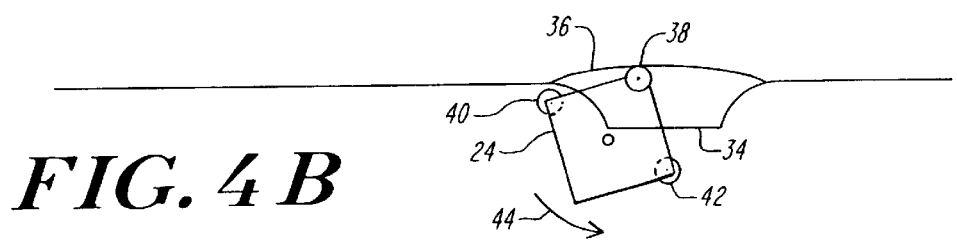

FIGS. 4a–4e show the rotation of the cam follower assembly 24 as the shuttle platform is moved along the rails 16. As shown in FIG. 4a, at the start of the movement, upper roller 38 and lagging lower roller 40 are both engaged with the cam surface 26 on the side of a rail 16. The leading lower roller 42 is not engaged with the cam surface. In FIG. 4b, the upper roller 38 engages the upper cam track 36, and the lagging lower roller 40 engages the lower cam track 34. The lagging lower roller 40 moves the cam follower assembly 24 in the direction shown by arrow 44. The upper roller 38 prevents excessive rotation of the cam follower assembly 24, thereby providing precise rotation of the cam follower assembly based on the distance of linear movement.

Figure 4C:
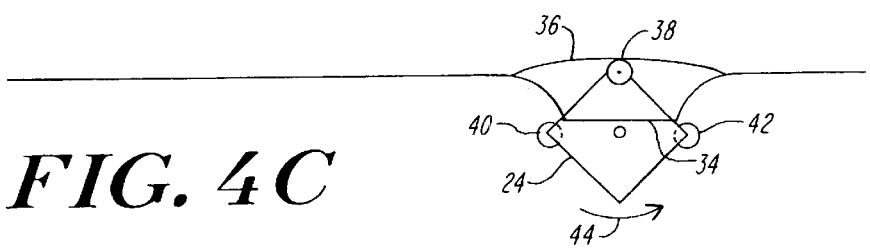
Figure 4D:
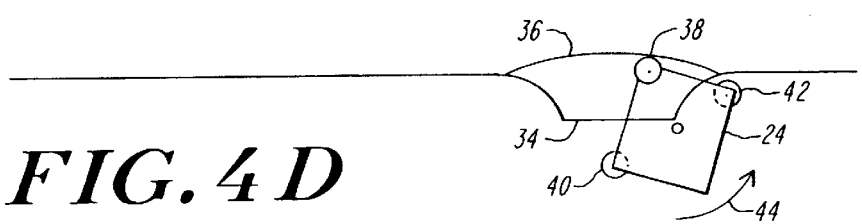
Figure 4E:
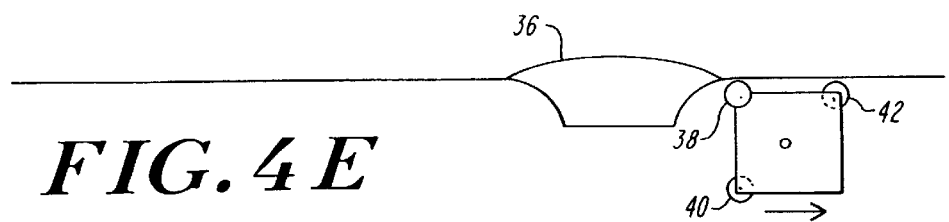

In FIG. 4c, the lagging lower roller 40 has caused the cam follower assembly to be rotated 45 degrees, disposing the leading roller 42 towards the lower cam track 34. As the lagging roller 40 disengages from the cam track 34, the leading roller 42 engages the track 34. As linear movement continues, shown in FIG. 4d, the upper roller 38 continues the rotation of the cam assembly in the direction of arrow 44. The leading roller 42 prevents excessive rotation. FIG. 4e shows the completion of the 90 degree rotation. At this point, the leading roller 42 and the upper roller 38 are engaging the cam surface 26, and the lagging roller 40 is not engaged.

Since there are always at least two rollers engaging the cam tracks 34 and 36, the rotation of the cam follower assembly 24, and therefore the rotation of the payload platform 12, is precisely determined by the amount of linear movement of the shuttle platform. The contour of the upper and lower cam tracks 34, 36 provides a cycloidal motion profile by smoothing rotary acceleration and deceleration, and avoids sudden movement which can dislodge wafers on the payload platform.

Figure 5:
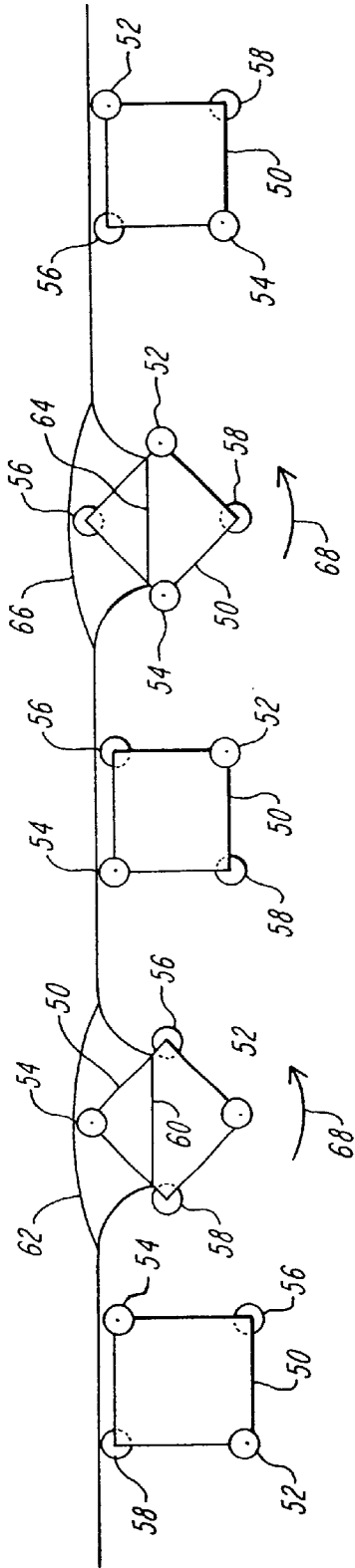
FIG. 5 is an alternate embodiment which rotates the cam follower assembly 180 degrees.

In another embodiment, shown in FIG. 5, a 180-degree rotational movement is shown. In this embodiment, the cam follower assembly 50 includes an extra upper roller, and the cam surface includes a second segment of upper and lower tracks. A leading and a lagging upper roller 54, 52 respectively, are provided. As the cam follower assembly 50 moves, the leading upper roller 54 engages a first upper cam track segment 62, and a lagging lower roller 58 engages a first lower cam track segment 60, similar to FIG. 4b. The leading lower roller 56 and lagging upper roller 52 remain disengaged. As the cam follower assembly rotates in the direction shown by arrow 68, the lagging lower roller 58 disengages the track 60 as the leading lower roller engages the track 60, similar to FIG. 4c. After passing the first upper and lower cam tracks 62, 60, the cam assembly 50 has rotated 90 degrees. A second upper and lower cam track segment 66, 64 are provided. The second segments 66, 64 reverse the contour of the upper and lower segments. Therefore, the second upper segment 64 has a contour similar to the first lower segment 60, and the second lower segment 66 has a contour similar to the first upper segment 62. The leading upper roller 54 engages the second upper segment 64, and the leading lower roller 56 engages the second lower segment 66. As rotation continues in the direction of arrow 68, lagging upper roller 52 engages the second upper segment 64 as the leading upper roller 54 disengages the segment 64. After the cam follower assembly has passed the second segments 64, 66, a full 180 degree rotation has been completed.

Figure 6:
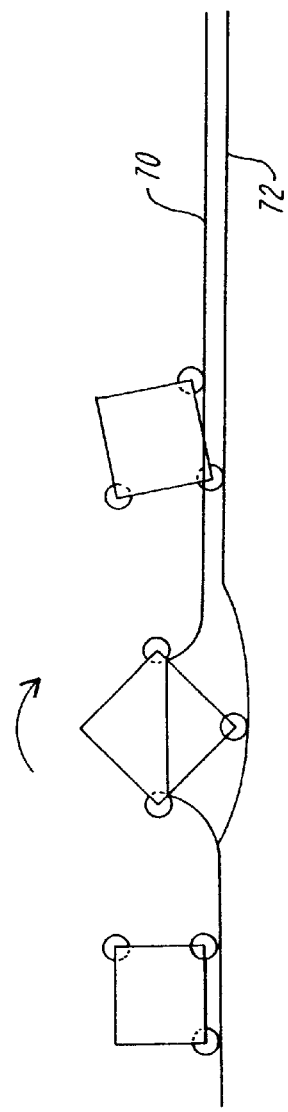
FIG. 6 is an alternate embodiment which rotates the cam follower assembly a predetermined amount.

In a further embodiment, shown in FIG. 6, a selected degree of rotation can be achieved. Since the degree of rotation is determined by the distance that the rollers on the cam follower assembly are disposed from the contour of upper and lower cam tracks 70, 72, rotation can be varied by altering the contour of the cam tracks 70, 72. Lower cam track 70 does not return to a colinear orientation with respect to the upper cam track. In this manner, a predetermined rotation less than 90 degrees is achieved.

Those of ordinary skill in the art should further appreciate that variations to and modification of the above-described methods and apparatus, particularly with respect to inverting the positions of the upper and lower tracks, may be made without departing from the inventive concepts disclosed herein. Accordingly, the invention should be viewed as limited solely by the scope and spirit of the appended claims.

What is claimed is:

1. A transport shuttle adapted to support a payload and operable for predetermined rotation of the payload in response to linear movement comprising:

a shuttle platform adapted for linear movement along a predetermined path;

a payload platform rotatably mounted to the shuttle platform;

a cam surface comprising a first cam track and a second cam track vertically displaced with respect to the first cam track, the first cam track and the second cam track each having coplanar linear portions and diverging portions, the diverging portions configured to diverge in opposed directions from a common point along the predetermined path; and a cam follower assembly attached to the payload platform and operable to rotate the payload platform, the cam follower assembly comprising at least a first roller disposed to engage the first cam track and a second roller disposed to engage the second cam track, the first roller linearly offset from the second roller in a direction to provide engagement of the first roller with the diverging portion of the first cam track in advance of engagement of the second roller with the diverging portion of the second cam track, to cause rotation of the payload platform in response to linear movement of the shuttle platform along the predetermined path.

2. A transport shuttle assembly to transport a payload and to rotate the payload in response to linear movement, comprising:

a pair of rails defining a predetermined path;

a shuttle platform disposed for movement along the pair of rails;

a payload platform rotatably mounted to the shuttle platform;

a cam surface disposed between the pair of rails, the cam surface comprising a first cam track and a second cam track each having a linear portion and a diverging portion; and a cam follower assembly attached to the payload platform and operable to rotate the payload platform, the cam follower assembly comprising at least a first roller disposed beneath the shuttle platform in engagement with the first cam track and a second roller disposed beneath the shuttle platform in engagement with the second cam track, the first roller and the second roller operative to rotate the payload platform by engagement with the diverging portions of the first cam track and the second cam track in response to linear movement of the shuttle platform along the predetermined path.

3. The transport shuttle of claim 1, wherein the movement of the shuttle platform in a first linear direction along the predetermined path causes rotation of the cam follower assembly in a first rotational direction, and movement of the shuttle platform in an opposed linear direction causes rotation of the cam follower assembly in an opposite rotational direction.

4. The transport shuttle of claim 1, wherein the payload platform is attached to a shaft extending through the shuttle platform and the cam follower assembly is attached to an opposed end of the shaft.

5. The transport shuttle of claim 1, wherein the at least first and second rollers comprise a plurality of rollers disposed on the cam assembly so as to provide simultaneous engagement of at least a subset of the plurality of rollers with at least a portion of the cam surface.

6. The transport shuttle of claim 1, wherein the first cam track comprises an upper track and the second cam track comprises a lower track.

7. The transport shuttle of claim 5, wherein the cam follower assembly further comprises first and second sides and the rollers are disposed such that the rollers on the first side are adapted to engage the first cam track and the rollers disposed on the second side are adapted to engage the second cam track.

8. The transport shuttle of claim 6, wherein the at least first and second rollers comprise at least one upper roller adapted to engage the upper track and at least one lower roller adapted to engage the lower track.

9. The transport shuttle of claim 8, wherein the upper track is constantly engaged with at least one of the upper rollers and the lower track is constantly engaged with at least one of the lower rollers.

10. The transport shuttle of claim 8, wherein the at least one lower roller further comprises a plurality of lower rollers.

11. The transport shuttle of claim 8, wherein the at least one upper roller further comprises a plurality of upper rollers.

12. The transport shuttle of claim 10, wherein the plurality of lower rollers further comprises a leading lower roller and a lagging lower roller, and the leading and lagging rollers are disposed on the cam follower assembly such that the leading and lagging rollers are not simultaneously engaging the lower track.

13. The transport shuttle of claim 6, wherein the diverging portion of the upper track in generally concave and the diverging portion of the lower track is generally convex.

14. The transport shuttle of claim 6, wherein the diverging portion of the lower track includes a first portion having an increasing slope with respect to the predetermined path, a second portion having a constant slope with respect to the predetermined path, and a third portion having a decreasing slope with respect to the predetermined path.

15. The transport shuttle of claim 6, wherein the diverging portion of the upper track includes a first portion having an increasing slope with respect to the predetermined path, and a second portion having a decreasing slope with respect to the predetermined path.

16. The transport shuttle of claim 12, wherein the diverging portion of the upper track includes a first portion having an increasing slope with respect to the predetermined path, and a second portion having a decreasing slope with respect to the predetermined path, and the diverging portion of the lower track includes a first portion having an increasing slope with respect to the predetermined path, a second portion having a constant slope with respect to the predetermined path, and a third portion having a decreasing slope with respect to the predetermined path, and wherein a first increment of rotation of the cam follower assembly is caused by the lagging lower roller engaging the first portion of the lower track, and a second increment of rotation is caused by the upper roller engaging the second portion of the upper track.

17. The transport shuttle of claim 16, wherein the first increment of rotation is limited by said upper roller engaging said first portion of said upper track, and said second increment of rotation is limited by said leading lower roller engaging the third portion of said lower track.

18. The transport shuttle of claim 11, wherein the cam follower assembly further comprises a lagging upper roller and the diverging portions of the upper track and the lower track each comprise at least one generally convex portion and at least one generally concave portion.

19. The transport shuttle of claim 1, wherein the cam surface and the cam follower assembly are adapted for smooth rotational acceleration and deceleration.

20. The transport shuttle of claim 1, wherein the cam surface and the cam follower assembly are adapted for rotation having a smooth motion profile in response to a constant linear velocity along the predetermined path.

21. The transport shuttle of claim 20, wherein the smooth motion profile is cycloidal rotational momentum.

22. The transport shuttle assembly of claim 2, wherein the shuttle platform further includes glides that ride on the rails.

23. The transport shuttle assembly of claim 2, wherein the movement of the shuttle platform in a first linear direction along the predetermined path causes rotation of the cam follower assembly in a first rotational direction, and movement of the shuttle platform in an opposed linear direction causes rotation of the cam follower assembly in an opposite rotational direction.

24. The transport shuttle assembly of claim 2, wherein the payload platform is attached to a shaft extending through the shuttle platform, and the cam follower assembly is attached to an opposed end of the shaft.

25. The transport shuttle assembly of claim 2, wherein the at least first and second rollers comprise a plurality of rollers disposed on the cam assembly so as to provide simultaneous engagement of at least a subset of the rollers with the cam surface.

26. The transport shuttle assembly of claim 2, wherein the first cam track comprises an upper track and the second cam track comprises a lower track.

27. The transport shuttle assembly of claim 26, wherein the linear portions of the upper track and the lower track are coplanar and the diverging portions of the upper track and the lower track are curved in opposed directions.

28. The transport shuttle assembly of claim 26, wherein the cam follower assembly further comprises first and second sides and the rollers are disposed such that the rollers on the first side are adapted to engage the upper track and the rollers disposed on the second side are adapted to engage the lower track.

29. The transport shuttle assembly of claim 26, wherein the at least first and second rollers comprise at least one upper roller adapted to engage the upper track and at least one lower roller adapted to engage the lower track.

30. The transport shuttle assembly of claim 29, wherein the upper track is constantly engaged with at least one of the upper rollers and the lower track is constantly engaged with at least one of the lower rollers.

31. The transport shuttle assembly of claim 29, wherein the at least one lower roller further comprises a plurality of lower rollers.

32. The transport shuttle assembly of claim 31, wherein the plurality of lower rollers further comprises a leading lower roller and a lagging lower roller, and the leading and lagging rollers are disposed on the cam follower assembly such that the leading and lagging rollers are not simultaneously engaging the lower track.

33. The transport shuttle assembly of claim 29, wherein the at least one upper roller further comprises a plurality of upper rollers.

34. The transport shuttle assembly of claim 33, wherein:
the diverging portion of the upper track includes a first portion having an increasing slope with respect to the predetermined path, and a second portion having a decreasing slope with respect to the predetermined path;
the diverging portion of the lower track includes a first portion having an increasing slope with respect to the predetermined path, a second portion having a constant slope with respect to the predetermined path, and a third portion having a decreasing slope with respect to the predetermined path; and
a first increment of rotation of the cam follower assembly is caused by the lagging lower roller engaging the first portion of the lower track, and a second increment of rotation is caused by the upper roller engaging the second portion of the upper track.

35. The transport shuttle assembly of claim 34, wherein the first increment of rotation is limited by the upper roller engaging the first portion of the upper track, and the second increment of rotation is limited by the leading lower roller engaging the third portion of the lower track.

36. The transport shuttle assembly of claim 26, wherein the diverging portion of the upper track in generally concave and the diverging portion of the lower track is generally convex.

37. The transport shuttle assembly of claim 26, wherein the diverging portion of the lower track includes a first portion having an increasing slope with respect to the predetermined path, a second portion having a constant slope with respect to the predetermined path, and a third portion having a decreasing slope with respect to the predetermined path.

38. The transport shuttle assembly of claim 26, wherein the diverging portion of the upper track includes a first portion having an increasing slope with respect to the predetermined path, and a second portion having a decreasing slope with respect to the predetermined path.

39. The transport shuttle assembly of claim 2, wherein the cam surface and the cam follower assembly are adapted for smooth rotational acceleration and deceleration.

40. The transport shuttle assembly of claim 2, wherein the cam surface and the cam follower assembly are adapted for rotation having a smooth motion profile in response to a constant linear velocity along the predetermined path.

41. The transport shuttle assembly of claim 40, wherein the smooth motion profile is cycloidal rotational momentum.

* * * * *